United States Patent [19]

Hashimoto

[11] 4,423,359

[45] Dec. 27, 1983

[54] ELECTRIC MOTOR

[75] Inventor: Koosuke Hashimoto, Moriguchi, Japan

[73] Assignee: Mitsubishi Denki Kabushiki Kaisha, Tokyo, Japan

[21] Appl. No.: 259,611

[22] Filed: May 1, 1981

[30] Foreign Application Priority Data

| May 13, 1980 | [JP] | Japan | 55-63493 |
| Jul. 31, 1980 | [JP] | Japan | 55-105269 |
| Aug. 13, 1980 | [JP] | Japan | 55-111442 |
| Feb. 2, 1981 | [JP] | Japan | 56-16033 |
| Feb. 2, 1981 | [JP] | Japan | 56-16034 |

[51] Int. Cl.$^3$ ............................................. B65H 59/38
[52] U.S. Cl. ......................................... 318/6; 310/92; 310/118; 318/9; 318/491
[58] Field of Search ............ 318/6, 9, 112, 491, 318/540; 310/76, 78, 92, 103–105, 112, 114, 118, 268

[56] References Cited

U.S. PATENT DOCUMENTS

| 4,007,390 | 2/1977 | Muller et al. | 310/90 |
| 4,181,867 | 1/1980 | Muller | 310/156 |

FOREIGN PATENT DOCUMENTS 1038918  9/1978  Canada ............................ 310/114

OTHER PUBLICATIONS

K. Fujisawa et al., "Rotary Head Assembly having Direct-Coupled Electronic Commutation Motor for VHS VTR"; National Technical Report vol. 25, No. 1, Feb. 1979; pp. 47, 51 and 52.

"Controlling Sensor 'Hall element' Spread in Use Due to Improvements in Performance"; Nikkei Mechanical, Apr. 30, 1979, pp. 81, 82, 83 and 84.

Primary Examiner—J. V. Truhe
Assistant Examiner—A. Evans
Attorney, Agent, or Firm—Wenderoth, Lind & Ponack

[57] ABSTRACT

An electric motor for a magnetic tape recorder comprises an electrically insulating disk-shaped stator with a plurality of flatwise coils, a rotary shaft rotatably extending through the stator, and a first disk-shaped rotor of soft iron with a multi-pole annular magnet and a second disk-shaped rotor of soft iron rotatably extending through the shaft on both sides of the stator. A pulley is fixed on the shaft below the first rotor to drive capstans, and a reel disc or a pinion is coaxially connected to the second rotor to drive a take-up reel for forward play. In a fast forward feed mode, the first and second rotors can be mechanically interlinked. Alternatively, an electromagnetic solenoid may be used to take out a torque from the first rotor by engaging an idle roller with a roller fixed to the rotary a shaft above the pinion or to apply a pressure to the second rotor to increase the friction between the second rotor and an adjacent shoulder on the shaft.

22 Claims, 21 Drawing Figures

ELECTRIC MOTOR

BACKGROUND OF THE INVENTION

This invention relates to an electric motor, and more particularly to a synchronous motor disposed in a real taking-up mechanism for a magnetic recording and reproducing apparatus.

A conventional reel taking-up mechanism includes a reel disk rotatable about the longitudinal axis thereof and including an upper end arranged to engage a take-up or a supply reel for a magnetic tape, and a rotor disk formed, for example, of soft iron and sandwiched between the lower surface of the disk and a circularly annular magnet concentric with the rotor disk to form a rotor of an electric motor. The annular magnet is magnetized so that four N poles alternate with four S poles to form an angular interval of 45 degrees between each pair of adjacent poles. Disposed below the annular magnet are a plurality of flatwise coils at predetermined equal angular intervals on a stator disk formed, for example, of soft iron and located coaxially with the motor disk to form a stator of the electric motor.

In operation a rotary magnetic field is established by the flatwise coils and rotates the annular magnet in synchronization with the rotary field, thus resulting in the rotation of the reel disk.

In conventional reel taking-up mechanisms such as described above, an eddy current is generated on the stator disk due to the rotation of the magnetized magnet, thus resulting in the disadvantages that a loss is caused in the resulting torque and the consumption of electric power is increased. Also there is a problem that the torque is not sufficient for each of the operations of fast forward feed and rewinding of an associated magnetic tape.

Accordingly it is an object of the present invention to provide a new and improved electric motor utilizing effectively an eddy current caused thereon to produce a torque to decrease the loss of a torque and therefore to reduce the consumption of electric power.

It is another object of the present invention to provide a new compact electric motor, including a pair of output shafts, which is capable of stabilizing the driving characteristic of an associated reel shaft and is capable of varying optionally a torque for driving the reel shaft.

SUMMARY OF THE INVENTION

The present invention provides an electric motor comprising coil means for establishing a rotary magnetic field, first rotor means including a circularly annular magnet opposing the coil means and rotated by the rotary magnetic field from the coil means, and second rotor means forming a magnetic circuit for a magnetic field established by the annular magnet on the first rotor means, the second rotor means being constructed to be rotated independently of the first rotor means, the first rotor means being rotated to produce a driving force.

In order to increase a rotational force taken out from the second rotor means, a connecting means may be disposed to connect releasably the first rotor means to the second rotor means to interlink the rotation of the first rotor means to that of the second rotor means.

Also, the first rotor means may be arranged to produce a constant rotational force and selection means is disposed to select either one of rotational forces from the first and second rotor means.

Further, in order to provide a variable torque from the second rotor means, control means may be disposed to control the number of rotations per unit time of the first rotor means. Alternatively, pressing means may be disposed to apply a pressure to the second rotor means.

BRIEF DESCRIPTION OF THE DRAWINGS

The present invention will become more readily apparent from the following detailed description taken in conjunction with the accompanying drawings in which.

Throughout the Figures like reference numerals designate identical or corresponding components.

DESCRIPTION OF THE PREFERRED EMBODIMENTS

Figure 1:
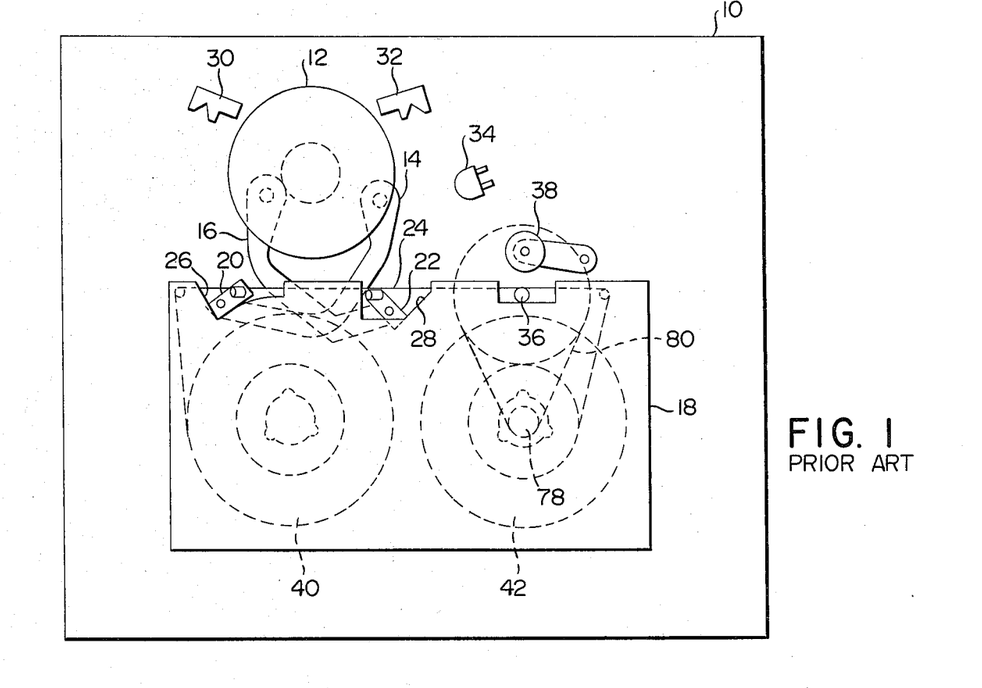
FIG. 1 is a schematic plan view of a conventional magnetic recording and reproducing apparatus for a video tape with the video tape put in its inoperative position.
Figure 2:
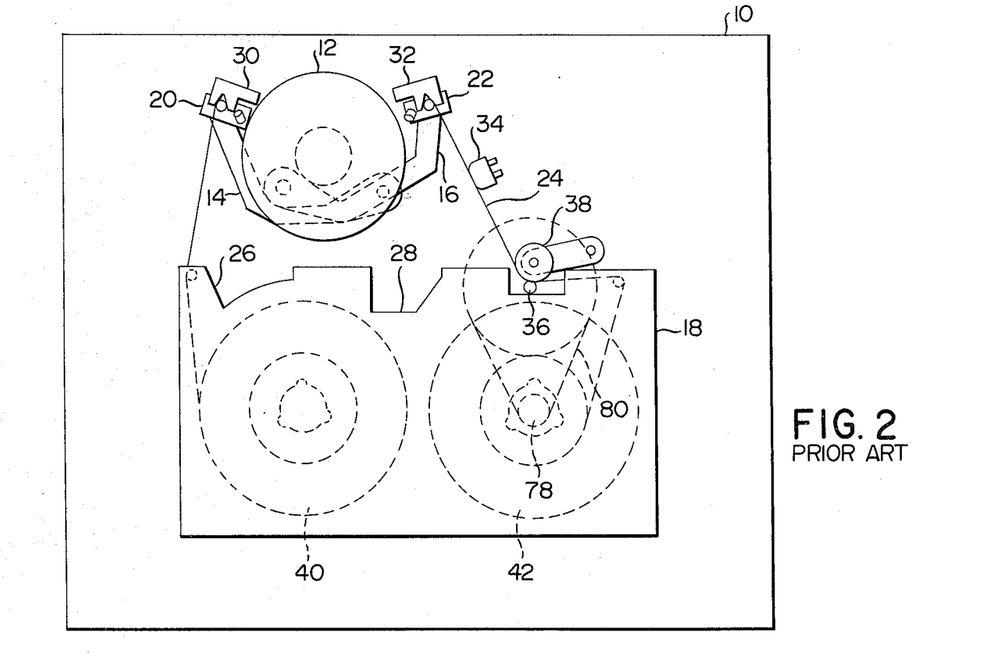
FIG. 2 is a view similar to FIG. 1 but illustrating the video tape brought into its operating position.

Referring now to FIGS. 1 and 2 of the drawings, there is illustrated a conventional video tape recorder as an example of conventional magnetic recording and reproducing apparatus which gives the background of the present invention and to which the present invention is applicable. The arrangement illustrated comprises a rectangular base plate 10, and a rotary drum 12, a rockable incoming guide arm 14 and a rockable outgoing guide arm 16 disposed on the base plate 10. Also a video cassette 18 is disposed in a predetermined position above the base plate 10.

Incoming and an outgoing tape guides 20 and 22, respectively, each are mounted to ends of the incoming and outgoing guide arms 14 and 16, respectively. In FIG. 1 wherein an associated magnetic tape 24 is entirely accommodated within the video cassette 18 and is ready for being drawn out from the cassette 18, the incoming and outgoing tape guides 20 and 22, respectively, are shown as being located in notches 26 and 28 disposed on that lateral side of the video cassette 18 near to the rotary drum 12 to engage the magnetic tape 24. As each guide arm 14 and 16 pivot about its central fulcrum and around the rotary drum 12, the tape guides 20 and 22 are moved toward the rotary drum 12 to draw out the magnetic tape 24 from the video cassette 18 until the two guides 20 and 22 abut against and are positioned by incoming and outgoing blocks 30 and 32, respectively, as shown in FIG. 2 wherein the magnetic tape 24 has been partly drawn out from the video cassette 18 to be ready for recording or reproducing. At that time, the magnetic tape 24 is partly wound around the rotary drum 12 and is engaged by a stationary magnetic head 34 for recording or reproducing an audio signal and control signals. Then the magnetic tape 24 is sandwiched between a capstan shaft 36 and a pinch roller 38 disposed on a capstan in readiness for traveling for the recording or reproducing operation.

Subsequently, a supply reel 40 or a take-up reel 42 disposed within the video cassette 18 engages a reel taking-up mechanism to be rotated, whereby the recording or reproducing operation is effected as the case may be. In the example illustrated the take-up reel 42 engages the reel taking-up mechanism.

Figure 3:
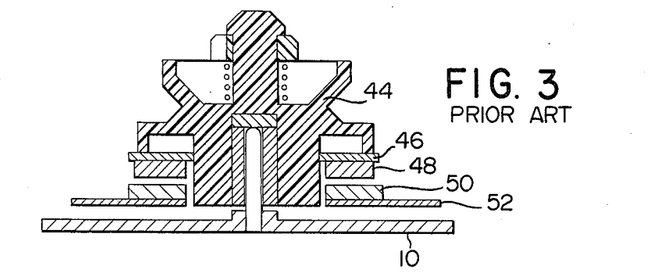
FIG. 3 is a longitudinal sectional view of a conventional reel taking-up mechanism used with the arrangement shown in FIGS. 1 and 2.

FIG. 3 shows a conventional reel taking-up mechanism to which the present invention is related. The arrangement illustrated comprises a plastic reel disk 44 including an upper end as viewed in FIG. 3 formed into a cap with a central mandrel engageable by the supply or take-up reel (not shown) in FIG. 3 and a flanged lower end having a rotor disk 46 sandwiched between the same and a circularly annular magnet 48. The reel disk 44 also includes a central projection extending from the lower end and rotatably held above the base plate 10. The rotor disk 46 is formed, for example, of soft iron to form a path for a magnetic flux as will be described later. The magnet rotor 48 is fixedly secured in concentric relationship with the rotor disk 46 to form a rotor of an electric motor with the reel disk 44 and includes a plurality of magnetic poles magnetized at equal angular intervals of 45 degrees thereon to have N poles alternating with S poles.

The arrangement comprises further a plurality of flatwise coils 50 and an annular disk-shaped stator 52 connected together into a unitary structure so that the flatwise coils 50 are disposed in spaced parallel relationship below the magnet rotor 48, and the stator 52 is disposed on the base plate 10 through fittings (not shown). The flatwise coils 48 are operative to establish a rotary magnetic field and the stator 52 is formed, for example, of soft iron and provides a magnetic circuit for the flatwise coils 50.

In the arrangement of FIG. 3, the magnet rotor 48 is rotated in synchronization with the rotary magnetic field established by the flatwise coils 50, thereby to rotate the reel disk 44. However, the rotation of the magnet rotor 48 causes an eddy current through the stator 52 leading to the disadvantage that the resulting torque has a loss and therefore the consumption of electric power increases. Also the arrangement of FIG. 3 has been disadvantageous in that the torque is insufficient for each of the operations of fast forward feed and rewinding of an associated magnetic tape.

The present invention contemplates to provide an electric motor which requires a decreased consumption of electric power by utilizing effectively an eddy current as described above to produce a driving torque decreased in loss.

The present invention contemplates also to provide a small-sized electric motor including a pair of output shafts so that an associated reel shaft has stabilized driving characteristics and a driving torque applied to the reel shaft is variable without the necessity of using a slip mechanism.

Figure 4:
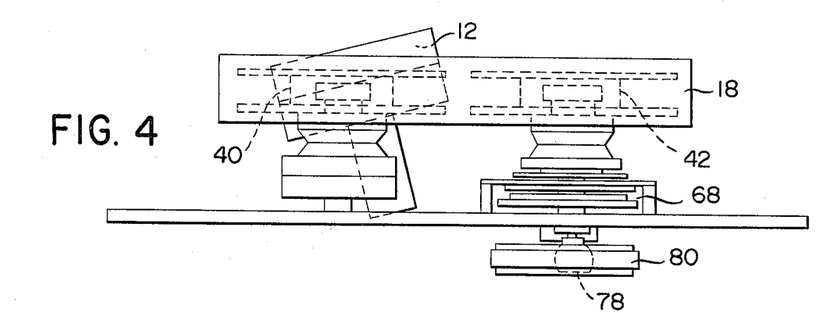
FIG. 4 is a schematic side elevational view of a reel taking-up mechanism including one embodiment of an electric motor of the present invention and engaging a video cassette, as viewed from the bottom of FIG. 1.

Referring now to FIG. 4, there is illustrated a reel taking-up mechanism for a magnetic recording and reproducing apparatus including one embodiment according to the electric motor of the present invention and engaging the take-up reel shown in FIGS. 1 and 2. Such embodiment is shown further in FIGS. 5 through 9.

Figure 5:
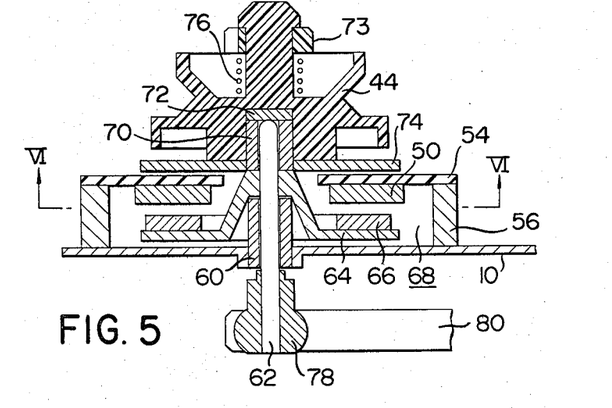
FIG. 5 is a longitudinal sectional view of the reel taking-up mechanism shown in FIG. 4.
Figure 6:
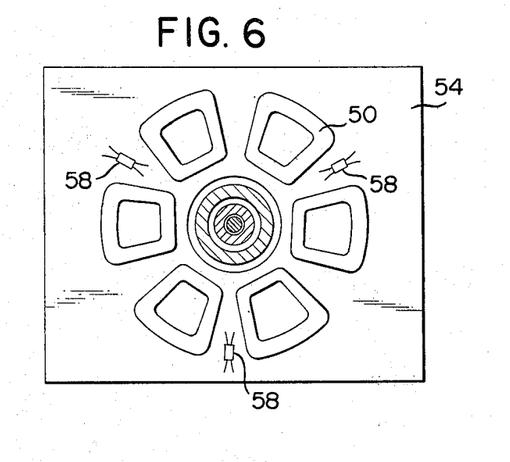
FIG. 6 is a plan view taken along the line VI—VI of FIG. 5.

The arrangement illustrated in FIG. 5 comprises a holding plate 54 with a central opening and formed of an electrically insulating material, in this case, a fiber reinforced plastic, for example, glass fibers impregnated with an epoxy resin and disposed on the base plate 10 through fittings 56. The holding plate 54 has a plurality of flatwise coils 50 disposed at predetermined equal angular intervals on one surface, in this case the lower surface thereof as viewed in FIG. 5, and a plurality of magnetic flux sensors 58 disposed at predetermined equal angular intervals on the lower surface thereof, for a purpose as will be apparent later, as shown in FIG. 6. In the example illustrated six flatwise coils 50 are disposed on the lower surface of the holding plate 54 and three magnetic flux sensor 58 are disposed on the lower surface thereof to be located between pairs of adjacent flatwise coils 50 and adjacent to radially outer end portions thereof. Further, the holding plate 54 has disposed on the lower surface thereof a copper foil formed into a predetermined circuit pattern suitable for disposing the flatwise coils 50 and the magnetic flux sensors 58 on the lower surface thereof and connecting them to associated components.

The base plate 10 includes bearing 60 fixedly extending therethrough to be perpendicular thereto. A rotary shaft 62 is rotatably fitted into the bearing 60 and includes one end portion protruding beyond the bearing 60 and fixedly extending through a central raised portion of a rotor disk 64 located between the base plate 10 and the holding plate 54. The rotor disk 64 is provided on that surface thereof facing the holding plate 54 with a circularly annular field magnet 66 concentric therewith and having a plurality of magnetic poles magnetized thereon so as to cause N poles to alternate with S poles at equal angular intervals of 45 degrees. The rotor disk 64 is formed of a magnetic material, for example soft iron, to act also as a path for a magnetic flux. The rotor disk 64 and the annular magnet 66 form a first rotor generally designated by the reference numeral 68.

The rotary shaft 62 further extends beyond the rotor disk 64 and is rotatably fitted into a white metal 70 to be rotatably held by the latter. The white metal 70 abuts at one end in this case the lower end as viewed in FIG. 5, against the rotor disk 64 and has the other end flush with the extended end of the rotary shaft 62 and closed with a thrust bearing 72 which is also contacted by the extended end of the rotary shaft 62.

A second rotor disk 74 is fixedly secured to the one end of the white metal 70 to be somewhat located above the holding plate 54 and to be rotatable independently of the first rotor 68. The second rotor disk 74 is formed of either a magnetic material having an eddy current characteristic, for example soft iron, or a magnetic material having a hystersis characteristic, such as a hard magnetic material, and serves also as a magnetic circuit for a space magnetic flux from the field magnet 66 of the first rotor 68. Further, a reel disk 44 is fixedly fitted onto the white metal 70 and the thrust bearing 72 and is concentrically disposed on the second rotor disk 74 to form a unitary structure with the latter.

The thrust bearing 72 is operative to position axially a second rotor composed of the second rotor disk 74, the reel disk 44 and the white metal 70 while forming an antifriction bearing for the rotary shaft 62.

The reel disc 44 is identical in shape to that shown in FIG. 3 and includes a plurality of splines 73 disposed at predetermined equal angular intervals on a free end portion of the mandrel and a compression spring 76 disposed around the mandrel between the splines 73 and the bottom of the cup. The splines 73 are arranged to engage a reel such as the take-up reel 42 shown in FIGS. 1 and 2.

The rotary shaft 62 is arranged to be rotated by the first rotor 68 and the other end portion thereof extends beyond the lower end of the bearing 60 as viewed in FIG. 5 and includes a pulley 78 fixed thereto. An endless rubber belt 78 is trained over the pulley 80 to transmit a rotational force from the first rotor 68 to a capstan including a capstan shaft such as shown by 36 in FIGS. 1 and 2.

The pulley 78 has such a pulley ratio that, when an associated magnetic tape travels in the normal state during recording or reproducing, the pulley 78 is rotated at about 1,500 rpm.

The pulley 78 and the endless belt 80 are also shown in FIGS. 1 and 2.

In operation, the magnetic flux sensors 58 sense a magnetic flux from the first rotor 68 and the flatwise coils 50 are driven by a control circuit (not shown). Thus the example illustrated results in a three phase-eight pole synchronous motor. Then, by causing to flow through the flatwise coils 50 a current either in accordance with a synchronizing signal separated from an associated video signal during the recording of images or in synchronization with a control signal reproduced from the stationary magnetic head 34 (see FIGS. 1 and 2) during reproducing of images, the first rotor 68 is rotated a predetermined number of rotations per unit time, for example at 1,500 rpm, due to the rotary magnetic field established by the flatwise coils 50. Also the magnetic flux from the field magnet 66 in the first rotor unit 68 passes through the second rotor disk 74 formed, for example, of soft iron so that a magnetic circuit is formed in the second rotor disk 74. The rotation of the first rotor unit 68 causes an eddy current to flow through the second rotor disk 74. This eddy current results in the generation of an eddy current torque in the second rotor disk 74 in a direction identical to the direction of rotation of the first rotor unit 68. This eddy current torque causes the second rotor disk 74 to be rotated independently of the first rotor unit 68.

Accordingly, the rotation of the first rotor 68 is transmitted to the capstan shaft 36 (see FIGS. 1 and 2) while the rotation of the second rotor disk 74 is transmitted to the reel disk 42 and therefore can be used to take up an associated magnetic tape.

From the foregoing it will readily be understood that, since the first rotor 68 and the second rotor disk 74 can be rotated independently of each other and since the second rotor disk 74 is directly connected to the reel disk 44, the single electric motor as shown in FIGS. 5 and 6 can be operated both as a synchronous motor for rotating the capstan shaft 36 and as a torque motor for rotating the reel disk 44.

Also from the foregoing it will readily be understood that an attraction is caused between the first rotor 68 and the second rotor disk 74 due to magnetic forces developed therebetween. The attraction is generally of 1 Kgf or more and in the example illustrated it is of about 1.5 Kgf. The attraction is advantageous in that, the reel disk 44 is effectively prevented from slipping out from the rotary shaft 62 during the rotation of the same without specific extra structure for preventing such slippage.

In summary, one aspect of the present invention provides an electric motor comprising coils disposed between first and second rotors, and arranged so that the first rotor is rotated with a rotary magnetic field from the coils while the second rotor is rotated with an eddy current caused from a magnetic flux originating from the first rotor. Therefore, the resulting motor is free from any torque loss caused by the eddy current and accordingly requires a low consumption of electric power.

While the present invention has been illustrated and described in conjunction with a single preferred embodiment thereof applied to a synchronous motor for video tape recorders, it is to be understood that the same is equally applicable to a variety of magnetic recording and reproducing apparatus including video tape recorders of the open reel type, audio tape recorders of the cassette and open reel type, etc. Also it is to be understood that the present invention is equally applicable to a variety of electronic equipment required to produce simultaneously a synchronous rotational force and a constant torque.

Figure 7:
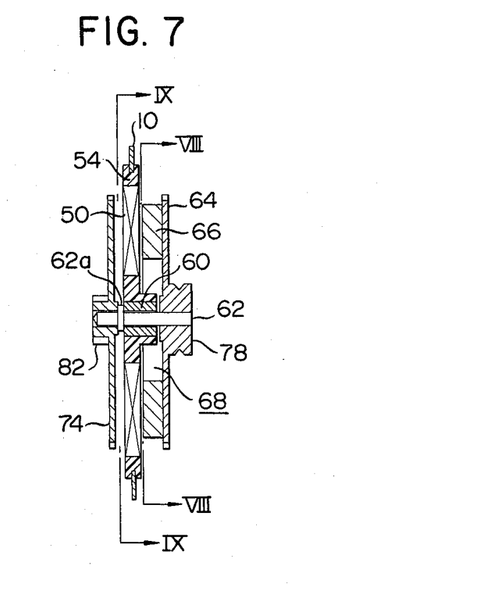
FIG. 7 is a view similar to FIG. 5 but illustrating a modification of the present invention.

Referring now to FIG. 7, there is illustrated a modification of the present invention. The arrangement illustrated comprises a holding plate 54 fixedly secured at the periphery thereof to the base plate 10 and including a plurality of flatwise coils 50 and a plurality of magnetic flux sensors disposed in a predetermined pattern thereon. In the example illustrated the holding plate 54 may be of the same electrically insulating material as that described above in conjunction with FIG. 5, and four flatwise coils 50 and two magnetic flux sensors 54 are disposed on the holding plate 50 as shown best in FIG. 9. More specifically, the four flatwise coils 50 are arranged on the holding plate 54 in the same pattern as shown in FIG. 6 excepting that in FIG. 9, a pair of diametrically opposite coils 50 are omitted and two magnetic flux sensors 58 are disposed on those portions of the holding plate 54 from which the coils have been omitted. Each of the coils 50 includes opposite surfaces flush with those of the holding plate 54. Further, around notch is formed in the holding plate 54 at one of the coil omitted portions thereof.

A rotary shaft 62 rotatably extends through a bearing 60 fixedly fitted into the central hole of the holding plate 54 with both ends of the bearing 60 flush with the opposite surfaces of a central thick portion of the holding plate 54 respectively. The rotary shaft 62 includes one end portion, in this case the righthand end portion as viewed in FIG. 7, extending beyond the bearing 60 and connected to the central portion of a pulley 78 to form a unitary structure. Thus the pulley 78 is freely rotatable with respect to the bearing 60 and includes a rotor disk 64 connected concentrically to that surface of the pulley 78 adjacent to the holding plate 54 to form a unitary structure.

Figure 8:
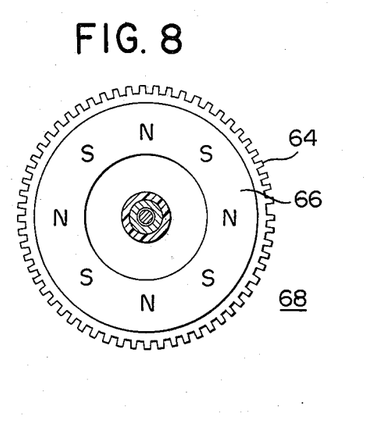
FIG. 8 is a sectional view taken along the line VIII—VIII of FIG. 7.

The rotor disk 64 is of the same material as that shown by 64 in FIG. 5 and has a circularly annular field magnet or rotor magnet 66 fixed to that surface thereof facing the holding plate 54 to be concentric with the latter. As shown in FIG. 8, the magnet 66 is magnetized in the same pattern as that described above in conjunction with FIG. 5 and forms a first rotor 68 with the rotor disk 64 connected to the pulley 78.

As shown in FIG. 8, the rotor disk 64 has its periphery entirely toothed to form a gear. The purpose of such gear is to transmit a rotational force from the first rotor 68 to an associated component and also to provide a control signal for controlling the rotational speed of the first rotor 68. Thus the rotor disk 64 with the toothed periphery forms a speed signal generator. In this case, the number of rotations per unit time of the rotor disk 64 or the first rotor 68 can be electromagnetically sensed because the disk 64 is formed of soft iron as described above. Alternatively, the number of rotations may be optically sensed.

The rotary shaft 62 includes the other or lefthand end portion extending beyond the bearing 60. The rotary shaft 62 is provided on that portion thereof just leaving the bearing 60 with a radial shoulder 62a and on the other end portion with a second rotor disk 74 equal in diameter to the first rotor disk 64. The second rotor disk 74 includes a hub rotatably fitted onto the rotary shaft 62 and having one end resting on the shoulder 62a. A pinion 82 is fixedly fitted onto the other end portion of a boss of second rotor disk 74, and the entire periphery of the second rotor disk 74 toothed for the purpose of transmitting the rotational force of the disk 74 to an associated component.

As in the arrangement of FIG. 5, an attraction is developed between the rotor magnet 66 and the second rotor disk 74 due to a magnetic force resulting from the rotor magnet 66 to cause a frictional force on the interface between the shoulder 62a on the rotary shaft 62 and that end surface of the second rotor disk 74 abutting against the shoulder 62a. Therefore, the second rotor disk 74 has the frictional force applied to the end surface thereof opposing the shoulder 62a, while the second rotor disk 74 can be rotated independently of the first rotor unit 68. Accordingly, the rotational force of the first rotor 68 contributes to a rotational force applied to the second rotor disk 74 via the frictional force.

The first rotor 68 can be controlled to a desired number of rotation per unit time by comparing an external synchronizing signal with a control signal generated by the teeth cut on the outer periphery of the first rotor 68 and sensed in an electromagnetic or optical manner well known in the art and controlling currents through the flatwise coils 50 in accordance with the result of the comparison. This results in the provision of a synchronous rotational torque from the rotor magnet 66 and therefore the pulley 78. The rotation of the rotor magnet 66 causes the second rotor disk 74 to generate a torque added with either one or both of an eddy current torque and a hysteresis torque as determined by the magnetic material forming the second rotor disk 74. As a result, there is generated on the second rotor disk 74 a rotational torque identical in direction to the rotation of the rotor magnet 66.

At the same time, the attraction developed at the interface between the shoulder 62a and the adjacent end surface of the second rotor disk 74 causes a frictional force on the shoulder 62a on the rotary shaft 62. That frictional force causes the first rotor 68 to generate a rotation force which is, in turn, added to the rotational torque of the second rotor disk 74. Thus, a resultant torque is generated by the second rotor disk 74. The resultant torque thus generated may be externally taken out through the pinion 82 integral with the second rotor disk 74.

The larger the difference between the number of rotations per unit time of the rotary shaft 62 or the number of synchronous rotations per unit time and the number of rotations per unit time of the second rotor disk 74, the higher will be the torque generated by the second rotor disk 74. The resultant torque thus generated has a relationship with a relative number of rotations per unit time or the difference in number of rotations per unit time between the first and second rotors such as shown by the solid line in FIG. 21, wherein the ordinate represents the generated torque in gr·cm and the abscissa represents the relative number of rotations per minute.

Figure 21:
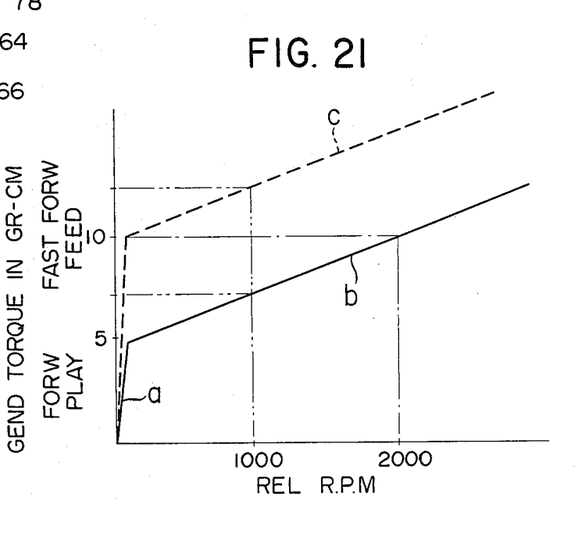
FIG. 21 is a graph illustrating the characteristics of the arrangement shown in FIGS. 18 and 19.

FIG. 21 illustrates the characteristics of another embodiment of the present invention shown in FIGS. 18 and 19 as will be described hereinafter. In FIG. 21, the solid line includes a portion a depicting a torque component resulting from the frictional force and another portion b depicting a torque component electromagnetically generated by the second rotor disk 74. The portion a indicates that the torque component is independent of the relative number of rotations per minute while the portion b indicates that the torque component increases proportionally to the relative number of rotations per minute.

Figure 9:
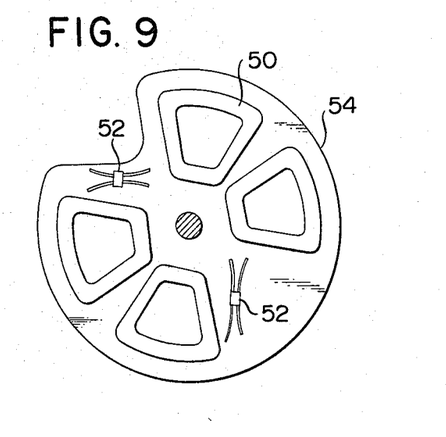
FIG. 9 is a plan view taken along the line IX—IX of FIG. 7.

According to the results of experiments conducted with the arrangement shown in FIGS. 7, 8 and 9, a torque of about 10 gr·cm has been taken out from the second rotor disk 74 through the pinion 80.

From the foregoing, it is seen that a substantially constant torque can be obtained from the rotational force provided by the second rotor disk 74 and independently of the number of rotations thereof per unit time. Thus the rotational force from the second rotor disk 74 can be used to rotate an associated reel for a magnetic tape, resulting in a substantially constant torque for taking up the magnetic tape.

Figure 11:
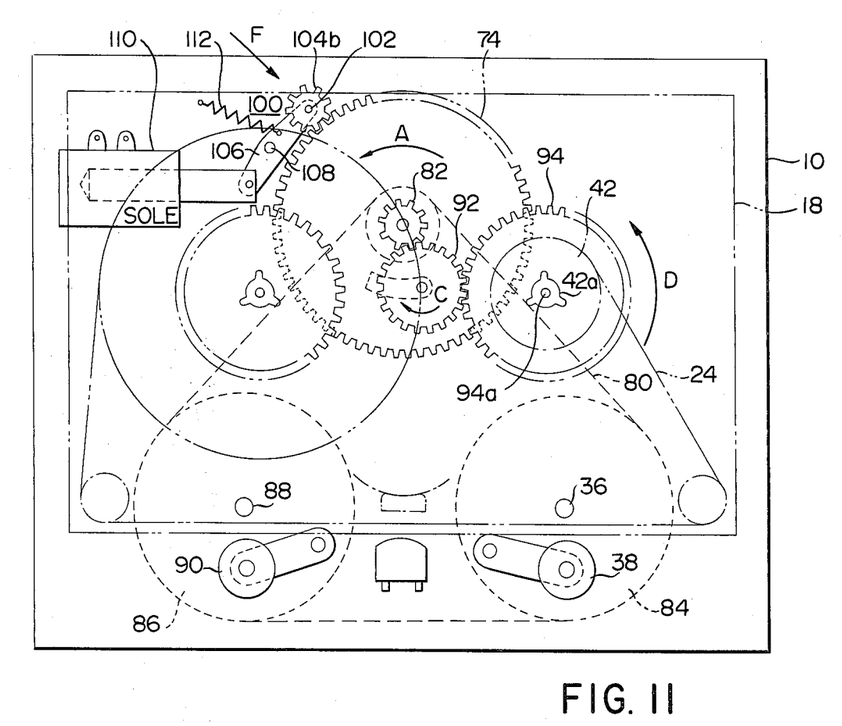
FIG. 11 is a view simiilar to FIG. 10 but illustrating the fast forward feed state.

FIG. 11 shows a magnetic recording and reproducing apparatus for an audio tape including the electric motor of the present invention as shown in FIGS. 7, 8 and 9.

The arrangement illustrated is operated in the forward play mode for recording or reproducing. In this arrangement the second rotor disk 74 is rotated in the direction of the arrow A shown in FIG. 11 to rotate synchronously the pinion 82 in the same direction. This rotation of the pinion 82 causes a forward capstan 84 to be rotated in the direction of the arrow B shown in FIG. 10 through an endless rubber belt 80 trained over the pulley 78, the forward capstan 84 and a rewind capstan 86 including a rewind capstan shaft 88 and a rewind pinch roller 90.

On the other hand, the pinion 82 meshes always with an idle gear 92 that, in turn, is disposed on an arm (not shown) so as to move its center along a circle having the center lying on the longitudinal axis of the rotary shaft 62 until the gear 92 meshes with a take-up gear 94 or with a supply reel gear 96, as determined by the direction of rotation of the pinion 82 with the idle gear 92 maintained to in meshing engagement with the pinion 82. In the example illustrated, the idle gear 92 engages the take-up reel gear 94 and is rotated in the direction of the arrow C shown in FIG. 11 to rotate the tape-up reel gear 94 in the direction of the arrow D shown in FIG. 11.

Under these circumstances, an associated magnetic tape 24 from a supply reel 40 travels at a predetermined constant speed past the rewind capstan shaft 88, and a forward capstan shaft 36 until it is taken up on tape-up reel 42 connected to the rotating gear 94 through a reel shaft 94 with the tape 24 movably pinched between the forward capstan shaft 36 and a pinch roller 38 disposed on the forward capstan 84.

The rewind capstan shaft 88 and the pinch roller 90 are put in their inoperative position in FIG. 11 and are brought into their operating position when the magnetic tape 24 is movably pinched therebetween during rewinding.

From the foregoing it is seen that the arrangement of FIG. 11 can take up the magnetic tape 24 under a substantially constant tension regardless of the number of rotations per unit time of each of the rotating components, thus resulting in a magnetic tape traveling system having good performance.

Figure 10:
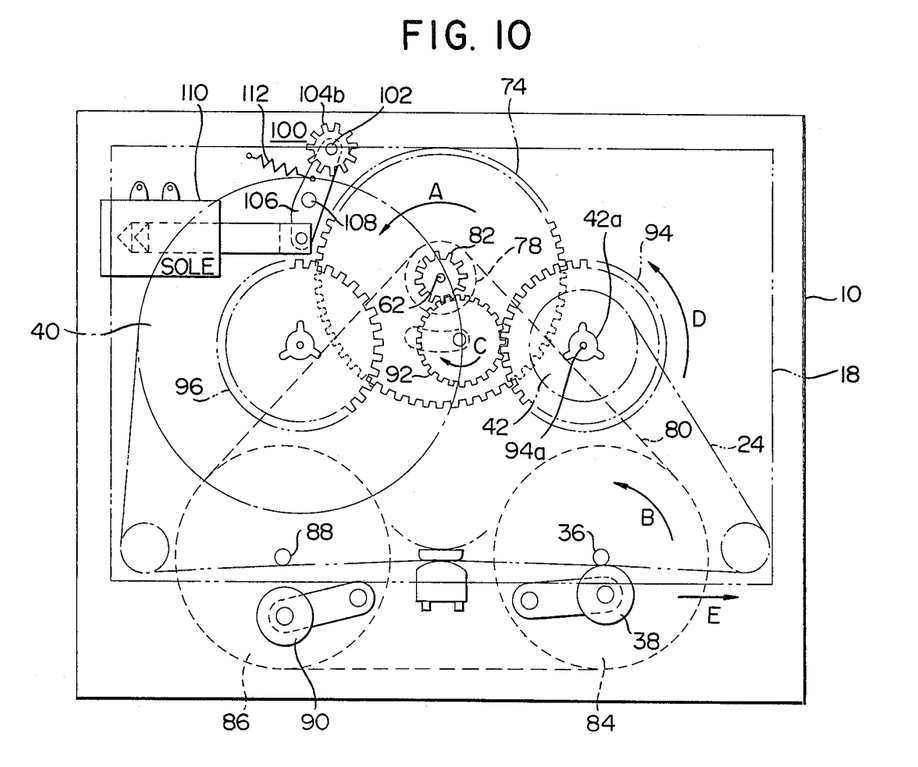
FIG. 10 is a schematic plan view of a magnetic recording and reproducing apparatus including another modification of the present invention illustrated in the forward play state.

In the arrangement of FIG. 10, it may be desirable to feed rapidly the magnetic tape 24 to the take-up reel 42 from the supply reel 40. In this event it is required to transmit a high rotational force to the reel shaft 94a for the take-up reel gear 94. To this end, connecting means as shown in FIG. 12 can be coupled to the first and second rotor disks 64 and 74 respectively.

Figure 12:
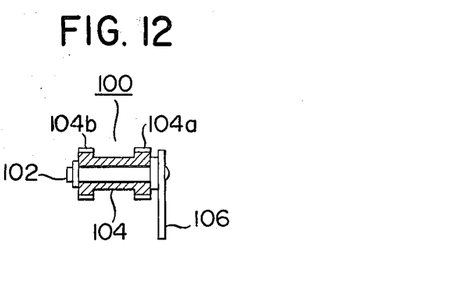
FIG. 12 is a sectional view of the connecting means shown in FIGS. 10 and 11.

In FIG. 12, the connecting means generally is designated by the reference numeral 100 and comprises a pinion shaft 102, a sleeve 104 rotatably fitted onto the pinion shaft 102 and provided on both ends with respective pinions 104a, 104b adapted to mesh with the gears formed on the outer peripheries of the first and second rotor disks 64 and 74 respectively.

That end of pinion shaft 102 adjacent to the pinion 104a is fixed to one end of a spring loaded lever 106 which is pivotally mounted on a pivot pin 108 and the other end of which is articulated to one end of a plunger of an electromagnetic solenoid 110, as shown in FIG. 10 or 11.

In FIG. 10, the solenoid 110 is in its deenergized state and the connecting means 100 is held away from engagement with the first and second rotor disks 64 and 74. However when energized, the solenoid 110 attracts its plunger to rotate the lever 106 about the pivot pin 108 in the clockwise direction as viewed in FIG. 10 and against the action of an associated spring 112 until the pinion 104a meshes with the outer teeth on the first rotor disk 64 while at the same time the pinion 104b meshes with the outer teeth on the second rotor disk 74 as shown in FIG. 11, wherein the arrangement is shown as being operated in the fast forward feed mode in which tape 24 from the supply reel 40 is quickly fed to the take-up reel 42.

In the arrangement of FIG. 11, a torque generated by the rotor magnet 66 in the first rotor 68 is transmitted to the second rotor disk 74 through the connecting means 100. In this case the first rotor is higher in torque then the second rotor disk 74. That is, the torque of the first rotor 68 and that of the second rotor disk 74 is composed into a high torque which is, in turn, transmitted to the take-up reel gear 94 through the pinion 82 and the idle gear 92. Thereafter the high torque is transmitted to the take-up reel 42 disposed in the audio cassette 18, through the reel shaft 94a, by the generation of a rotational force in the direction of the arrow D shown in FIG. 11. Thus the magnetic tape 24 from the supply reel 40 is quickly fed to and taken up on the take-up reel 42 rotated in the direction of the arrow D shown in FIG. 11. That is, the fast forward feed mode is effected. During the fast forward feed mode the magnet tape 24 does not engage, in addition to the rewind capstan shaft 88 and the pinch roller 90, the forward capstan shaft 36 or the pinch roller 38.

It will readily be understood that, in order to rewind the magnetic tape 24 on the take-up reel 42 about the supply reel 40, the arrangement of FIG. 10 or 11 can be operated in the same manner as described above excepting that the idle gear 92 meshes with the supply gear 96 with all the rotating components rotated in directions reverse from those illustrated.

Also, the connecting means 100 engages both the first rotor disk 64 and the second rotor disk 74 during rewinding of the magnetic tape.

From the foreing it is seen that, when the rotational force taken from the second rotor disk 74 is insufficient with the torque provided by that disk alone in the arrangement shown in FIGS. 7, 8 and 9, the rotational force can be increased to the required magnitude by using the connecting means 100 to transmit the synchronous rotational force from the first rotor 68 to the second rotor disk 74.

Figure 13:
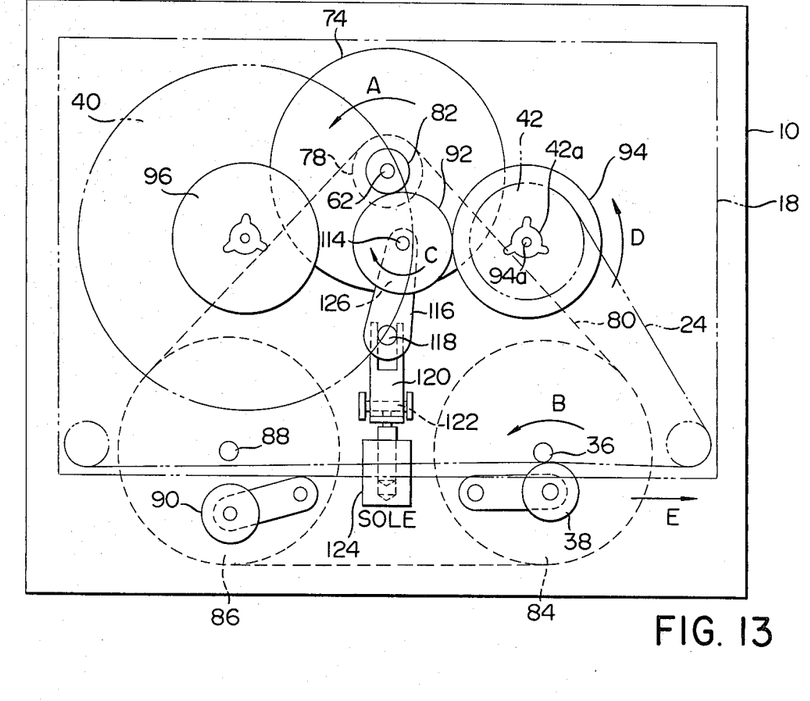
FIG. 13 is a schematic plan view of a magnetic recording and reproducing apparatus including still another modification of the present invention illustrated in the forward play state.
Figure 14:
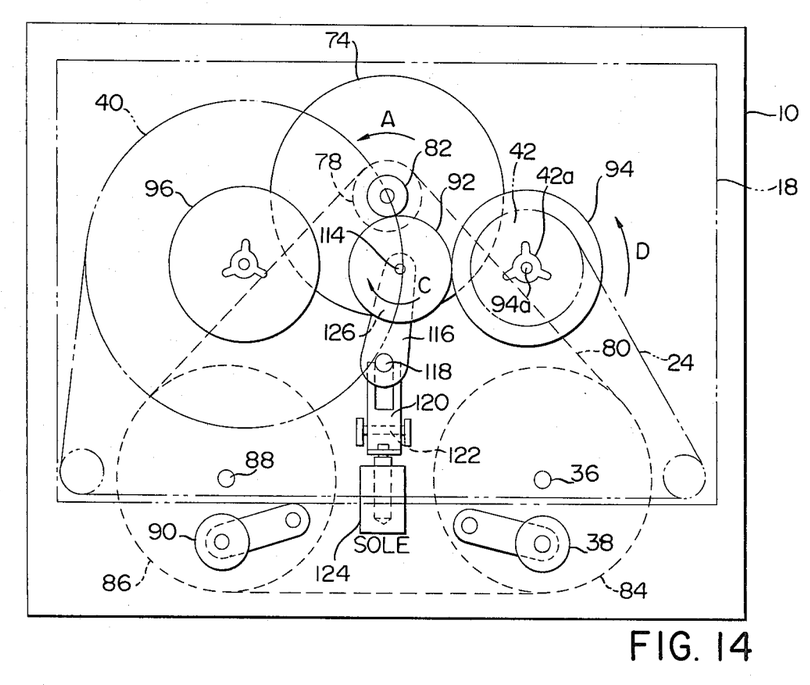
FIG. 14 is a view similar to FIG. 13 but illustrating the fast forward feed state.
Figure 15:
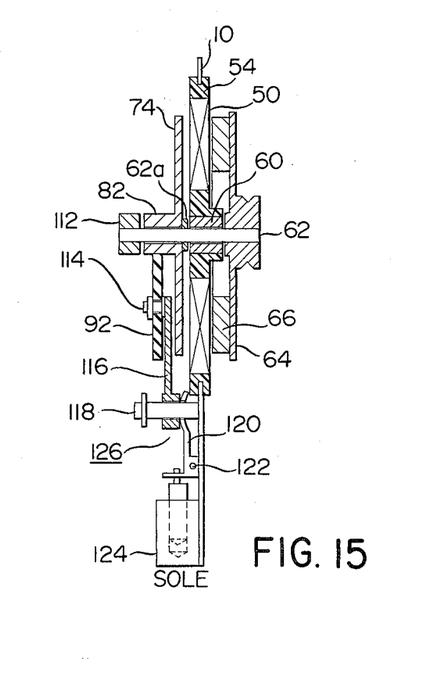
FIG. 15 is a longitudinal sectional view of the electric motor of the present invention shown in FIG. 13 with parts illustrated in elevation.
Figure 16:
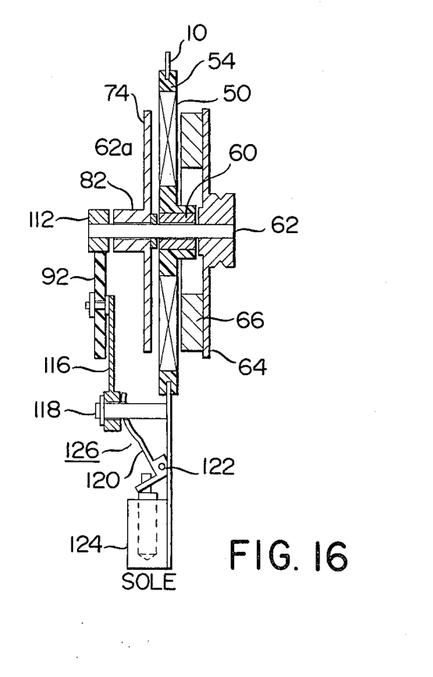
FIG. 16 is a view similar to FIG. 15 but illustrating the fast forward feed state.

FIGS. 13 and 14 show a magnetic recording and reproducing apparatus for an audio tape employing rollers put in compressive engagement with each other, but not the gears, according to another modification of the present invention shown in FIGS. 15 and 16. The arrangement illustrated is different from that shown in FIGS. 10 and 11 principally in that in FIGS. 13 and 14 the take-up reel can be driven by a selected one of the first rotor and second rotor disk.

Another modification of the present invention shown in FIG. 15 includes selection means operatively coupled to select the first rotor or the second rotor disk, as the case may be, with the selection means illustrated at its position suitable for forward play. FIG. 16 is similar to FIG. 15 but illustrates the selection means at its position suitable for fast forward feed.

The electric motor of the present invention illustrated in FIGS. 15 and 16 is different from that shown in FIG. 7 only in that in FIGS. 15 and 16, the first and second rotor disks 64 and 74 do not form gears, a roller 82 is substituted for the pinion 82 shown in FIG. 7 and another roller 112 is fixedly secured to the end of the rotary shaft 62 above the pulley 82.

As shown in FIG. 15, the roller 82 engages a plastic idle roller 92 rotatable about the axis of a pin 114 fixed to one end of a rockable arm 116 the other end of which is mounted on a stationary pin 118 for rotation and vertical movement. The pin 118 is erected on the base plate 10.

A selection arm 120 includes one end portion in the form of an L pivotally disposed on a pivot pin 122 and having one leg of the "L" normally resting on the base plate 10. The other end portion of the selection arm 120 is bifurcated so as to position movably the pin 118 between its bifurcated ends which, in turn, abut against the lower side of the other end of arm 116.

An electromagnetic solenoid 124 is disposed on the base plate 10 and includes a plunger having an exposed end articulated to the other leg of the L-shaped end portion of the selection arm 120.

Thus, selection means is formed of the plastic idle roller 92, the rockable arm 116, the stationary pin 118, the selection arm 120, the pivot pin 122 and the electromagnetic solenoid 124, for a purpose as will be apparent later and generally designated by the reference numeral 126.

In FIGS. 13 and 14 rollers are substituted for the corresponding gears shown in FIGS. 10 and 11 and the selection means 126 is disposed between the capstans 84 and 86 on the base plate 10 in place of for the connecting means shown in FIGS. 10 and 11. In other respects the arrangement is identical to that shown in FIGS. 10 and 11.

When the solenoid 124 is in its deenergized state, the plastic roller 92 engages the roller 82 on the second rotor disk 74 as shown in FIG. 15, whereby the rotational force from the second rotor disk 74 is taken out through the idle roller 92. The rotational force thus taken out is low enough to be suited for taking out the magnetic tape on the take-up reel.

When the solenoid 124 is put in its energized state, the plunger is pulled into the energized solenoid 124 to rotate the selection arm 120 about the axis of the pivot pin 122 in a counterclock direction as viewed in FIG. 15. This causes the rockable arm 116 to be moved along the stationary pin 118 in a leftward direction as viewed in FIG. 15 until the idle roller 92 occupies a position where the roller 92 engages the upper roller 112 fixed to the rotary shaft 62 as shown in FIG. 16. Thus the rotational force of the first rotor 68 is taken out through the idle roller 92. The rotational force thus taken out is high enough to be suited for fast forward feed.

Referring back to FIG. 13, the idle roller 92 engages the roller 82 under a pressure due to the tension of a spring (not shown) during rotation of the roller 82 in the direction of the arrow A shown in FIG. 13. Therefore the idle roller 92 is automatically moved toward the take-up roller 94 until it engages the roller 94.

If the roller 82 is rotated in a direction reverse from that illustrated, then the idle roller 92 can automatically disengage from the tape-up reel 94 to be moved and engaged toward and by the supply roller 96.

Further, when the direction of rotation of the electric motor is reversed, the idle roller 92 is automatically moved from one to the other of the take-up and supply rollers 94 and 96 respectively. At that time, by changing a correspondingly one of the forward and rewinding pinch rollers to engage the magnetic tape, the direction of travel of the tape is reversed. Therefore, the arrangement shown in FIGS. 13 through 16 is particularly advantageous for use with automatic reversal type audio cassette mechanisms.

From the foregoing it is seen that, according to the arrangement illustrated in FIGS. 13 through 16, the first rotor provides a driving force required for the magnetic tape to travel at a constant speed for recording or reproducing, while a selected one of the first rotor and second rotor disks provides a driving force required for the magnetic tape to be taken up. This results in a concise, highly reliable driving mechanism for traveling and taking up a magnetic tape in which a single electric motor is used to effect forward play and take-up of the magnetic tape without a slip mechanism, while providing the rotational force from the first rotor during fast forward feed and rewinding requiring a high take-up driving speed.

Figure 17:
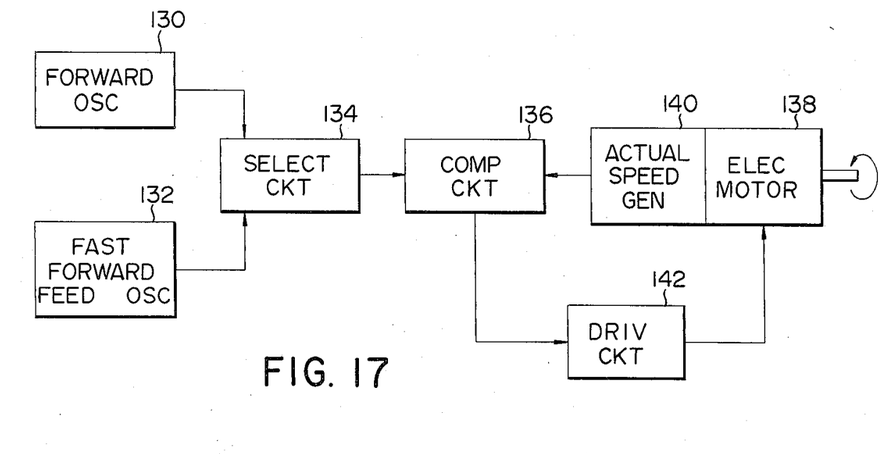
FIG. 17 is a block diagram of a control circuit for controlling the electric motor of the present invention.

FIG. 17 shows a block diagram of a control circuit for controlling the electric motor of the present invention such as shown in FIGS. 7, 8 and 9. The arrangement illustrated comprises a forward play oscillator 130 for generating a first reference oscillation frequency for determining the number of rotations per unit time of an electric motor required for an associated magnetic tape to to effect forward play for the recording or reproducing, and a fast forward feed oscillator 132 for generating a second reference oscillation frequency for determining the number of rotations per unit time of the electric motor required for the magnetic tape to be put in fast forward feed. These two oscillators 130 and 132 are connected to a selection circuit 134 which, in turn, selects outputs from oscillators 130 and 132 in response to a command signal from a control (not shown) and delivers the selected output to a comparison circuit 136.

On the other hand an electric motor 138, in this case that shown in FIGS. 7, 8 and 9, is shown in FIG. 17 as being combined with an actual speed generator 140. As described above, the actual speed generator 140 forms one part of the electric motor 138 to generate an actual speed signal in the form of a frequency proportional to the actual number of rotations per unit time of the electric motor 138.

The speed signal from the actual speed generator 140 is applied to the comparison circuit 136 where it is compared with the selected reference frequency from the selection circuit 134 to produce a control signal. The control signal is applied to a driving circuit 142 which, in turn, generates a corresponding driving electric power signal that is supplied to the electric motor 138 to control the latter to the desired number of rotations per unit time.

It is recalled that the electric motor of the present invention has the property that it generates a torque increased in proportion to an increase in the relative number of rotations per unit time between the first and second rotors. Such that property can be utilized to change the relative number of rotations so that the latter can be lowered during forward play of the magnetic tape for recording or reproducing and raised during fast forward feed. This results in the transmission of a high rotational force to an associated one of the take-up and supply reels during fast forward feed of the magnetic tape.

Thus it is seen that for the selection of the torque it is sufficient only to select the relative number of rotations per unit time. For example, in the arrangement of FIG. 11 with the connecting means 100 omitted, the pinion 82 has generated thereon a torque higher than that generated during the forward play travel of the magnetic tape in the arrangement of FIG. 10. This high torque is transmitted to the take-up reel gear 92, and therefore the mating take-up reel 42, to generate a rotational force in the direction of the arrow D shown in FIG. 11. This results in fast forward feed of the magnetic tape.

From the foregoing it will readily be understood that in the arrangement of FIG. 17 the rotational force taken out from the second rotor can be electrically selected, thus resulting in a compact and inexpensive magnetic recording and reproducing apparatus eliminating the necessity of using a slip mechanism and switching means previously required.

Figure 18:
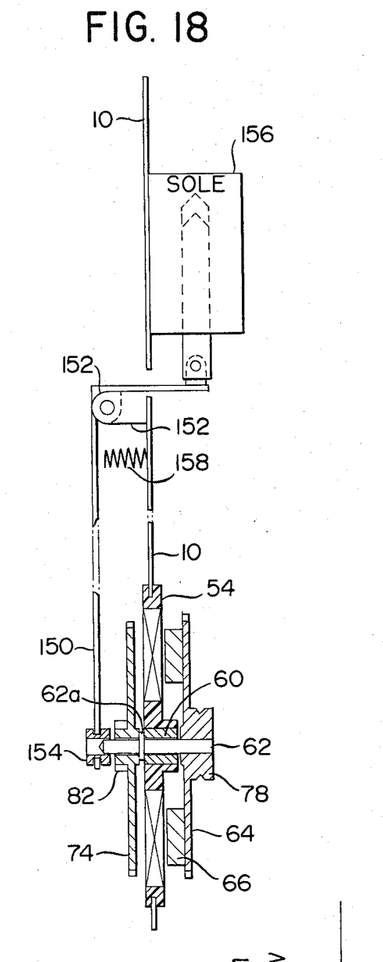
FIG. 18 is a longitudinal sectional view of a further modification of the present invention including pressing means put in its deenergized state with parts illustrated in elevation.
Figure 19:
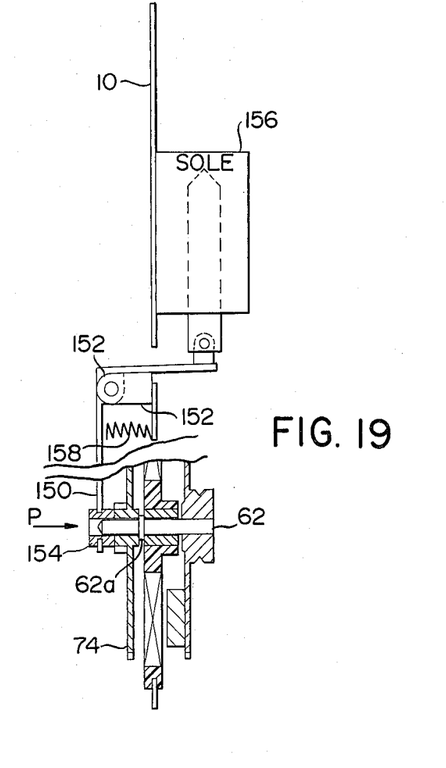
FIG. 19 is a view similar to FIG. 18 but illustrating the pressing means put in its energized state.

FIGS. 18 and 19 show a further modification of the present invention. The arrangement illustrated is different from that shown in FIG. 7 principally in that in FIGS. 18 and 19 pressing means is operatively connected to the rotary shaft of the electric motor. As shown in FIG. 18, a press arm 150 in the form of an L includes a bent portion rotatably journalled on a bearing 152 disposed on the base plate 10 through a stud, one end connected to a press bushing 154 and another end articulated to one end of a plunger of an electromagnetic solenoid 156 disposed on the base plate 10. The press bushing 154 is fitted onto the upper end of the rotary shaft 62 extending beyond the pinion 82 for relative axial movement. The press bushing 154 is normally maintained to be somewhat spaced from the pinion 82 by the action of a compression spring 158 located between the base plate 10 and that leg of the "L" connected to the press bushing 154.

Figure 20:
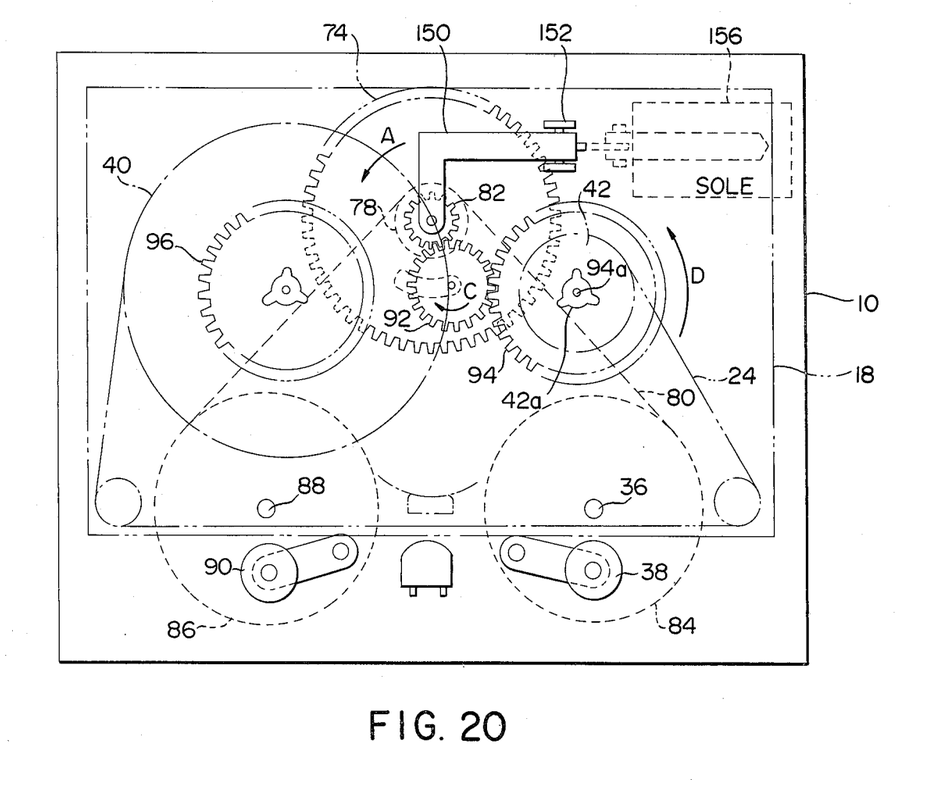
FIG. 20 is a schematic plan view of a magnetic recording and reproducing apparatus including the arrangement of FIG. 19 illustrated in the fast forward feed state.

The pressing means as described above can be incorporated into a conventional magnetic recording and reproducing apparatus in the manner shown in FIG. 20, with the electromagnetic solenoid 156 energized, as will be succeedingly described.

When energized, the electromagnetic solenoid 156 attracts the plunger to rotate the L-shaped pressing arm 150 about the central axis of the bearing 152 from its position shown in FIG. 18 (wherein the solenoid 156 is shown as being deenergized) to its position shown in FIG. 19 (wherein the solenoid 156 is shown as being energized) and against the action of the compression spring 158. This results in the press bushing 154 abutting and pressing against the pinion 82. Accordingly a compressive force is applied to the second rotor 74 in the direction of the arrow P shown in FIG. 19. The compressive force is controllable.

As described above in conjunction with FIG. 7, the attraction due to the magnetic force causes a frictional force between the shoulder 62a on the rotary shaft 62 and the adjacent surface of the second rotor disk 74. Thus, as the compressive force is applied to the second rotor disk 74, the frictional force increases, resulting in an increase in torque from the second rotor.

In FIG. 21 there are illustrated characteristics of the arrangement shown in FIGS. 18 and 19, solid line a—b depicting the torque generated from the second rotor disk 74 with the solenoid 156 deenergized and dotted line c depicting the torque increased due to the energization of the solenoid 156. As described above, solid line a depicts the torque resulting from the frictional force due to the magnetic attraction and increased as the frictional force becomes higher. Further the torque electromagnetically generated on the second rotor disk 74 is increased in proportion to the relative number of rotations per unit time as described above in conjunction with solid line b shown in FIG. 21.

Accordingly, with the electromagnetic solenoid 156 deenergized as shown in FIG. 18, the pinion 82 provides a generated torque following solid line a—b (see FIG. 21). On the other hand, with the solenoid 156 energized as shown in FIG. 19, the pinion 82 provides a generated torque following dotted line c (see FIG. 21). FIG. 21 illustrates that the torque required for each of forward play and fast forward feed is generated at 1,000 rpm. From the foregoing it is seen that the electromagnetic solenoid 156 need only be deenergized or energized to select the torque required for forward play or fast forward feed of the magnetic tape.

In FIG. 20, therefore, the pinion 82 has generated therefrom a torque greater than that generated therefrom during forward play of the magnetic tape and transmits such greater torque via the idle gear 92 to the take-up reel gear 94 and thence to the take-up reel 42. This results in the generation of a rotational force in the direction of the arrow D shown in FIG. 20. Accordingly the magnetic tape 24 can be fast fed in the forward direction.

While the present invention has been illustrated and described in conjunction with several preferred embodiments thereof, it is to be understood that numerous changes and modifications may be resorted to without departing from the spirit and scope of the present invention.

What is claimed is:

1. An electric motor comprising:
   disk-shaped first rotor means mounted for rotation about an axis, said first rotor means including a magnet;
   coil means, arranged generally in a plane extending transverse to said axis and axially confronting said magnet, for generating a rotary magnetic field to rotate said first rotor means, thereby to produce a driving force;
   disk-shaped second rotor means, mounted for rotation about said axis at an axial side of said coil means opposite from said first rotor means, for forming a magnetic circuit for a magnetic field generated by said magnet, such that said second rotor means is rotatable about said axis independently of said first rotor means; and
   connecting means for releasably mechanically connecting said first and second rotor means, such that the rotations thereof are joined.

2. A motor as claimed in claim 1, wherein said magnet has an annular configuration concentric with said axis.

3. A motor as claimed in claim 1, wherein said coil means comprise a plurality of flattened coils arranged in said plane and spaced annularly around said axis.

4. A motor as claimed in claim 3, wherein said coils are mounted on a holding plate extending transverse to said axis.

5. A motor as claimed in claim 1, wherein said connecting means comprises gears fixed to each of said first and second rotor means, and a pair of fixed pinions positioned to be meshed selectively with said gears.

6. A motor as claimed in claim 1, further comprising control means for controlling the number of rotations per unit time of said first rotor means, and thereby for varying the torque available from said second rotor means.

7. An electric motor comprising:
   disk-shaped first rotor means mounted for rotation with a constant rotational force about an axis, said first rotor means including a magnet;

coil means, arranged generally in a plane extending transverse to said axis and axially confronting said magnet for generating a rotary magnetic field to rotate said first rotor means, thereby to produce a driving force;

disk-shaped second rotor means, mounted for rotation about said axis at an axial side of said coil means opposite from said first rotor means, for forming a magnetic circuit for a magnetic field generated by said magnet, such that said second rotor means is rotatable about said axis independently of said first rotor means;

output means adapted to be driven selectively by said rotational force of said first rotor means or by the rotational force of said second rotor means; and selection means positioned for selectively connecting said output means to said first rotor means or to said second rotor means.

8. A motor as claimed in claim 7, wherein said magnet has an annular configuration concentric with said axis.

9. A motor as claimed in claim 7, wherein said coil means comprise a plurality of flattened coils arranged in said plane and spaced annularly around said axis.

10. A motor as claimed in claim 9, wherein said coils are mounted on a holding plate extending transverse to said axis.

11. A motor as claimed in claim 7, further comprising control means for controlling the number of rotations per unit time of said first rotor means, and thereby for varying the torque available from said second rotor means.

12. An electric motor comprising:

disk-shaped first rotor means mounted for rotation about an axis, said first rotor means including a magnet;

a shft extending through said first rotor means along said axis, said shaft being fixed to said first rotor means for rotation therewith, said shaft having an intermediate shoulder;

coil means, arranged generally in a plane extending transverse to said axis and axially confronting said magnet, for generating a rotary magnetic field to rotate said first rotor means, thereby to produce a driving force;

disk-shaped second rotor means, mounted for rotation about said axis at an axial side of said coil means opposite from said first rotor means, for forming a magnetic circuit for a magnetic field generated by said magnet, such that said second rotor means is rotatable about said axis independently of said first rotor means, said second rotor means being rotatably mounted on said shaft and resting on said shoulder such that said shoulder bears the force of a magnetic attraction between said first and second rotor means; and pressing means for applying to said shoulder through said second rotor means a compressive force controllable to vary the torque available from said second rotor means.

13. A motor as claimed in claim 12, wherein said magnet has an annular configuration concentric with said axis.

14. A motor as claimed in claim 12, wherein said coil means comprise a plurality of flattened coils arranged in said plane and spaced annularly around said axis.

15. A motor as claimed in claim 14, wherein said coils are mounted on a holding plate extending transverse to said axis.

16. A motor as claimed in claim 12, further comprising control means for controlling the number of rotations per unit time of said first rotor means, and thereby for varying the torque available from said second rotor means.

17. A magnetic recording and reproducing system comprising:

capstan shaft means for driving a magnetic tape;

reel means for winding up the magnetic tape;

an electric motor comprising;

first rotor means mounted for rotation about an axis, said first rotor means including a magnet;

coil means confronting said magnet for generating a rotary magnetic field to rotate said first rotor means such that a synchronous torque is produced thereby;

second rotor means, mounted for rotation about said axis independently of rotation of said first rotor means, for forming a magnetic circuit for a magnetic field generated by said magnet, such that said second rotor means receives a driving force due to the rotation of said first rotor means to produce an asynchronous torque;

first means joining said first rotor means to said capstan shaft means for rotating said capstan shaft means by said synchronous torque at a constant speed; and second means joining said second rotor means to said reel means for rotating said reel means by said asynchronous torque.

18. A system as claimed in claim 17, wherein said first rotor means is disk-shaped, said coil means is arranged in a plane extending transverse to said axis, and said second rotor means is disk-shaped and positioned at an axial side of said coil means opposite from said first rotor means.

19. A system as claimed in claim 17, further comprising, during fast feed or rewinding operation of said system, connecting means for releasably mechanically connecting said first and second rotor means, such that the rotations thereof are joined for rotating said reel means.

20. A system as claimed in claim 17, further comprising selection means for, during fast feed or rewinding operation of said system, driving said reel means by the rotational force of said first rotor means.

21. A system as claimed in claim 17, further comprising control circuit means for, during fast feed or rewinding operation of said system, increasing the number of rotations per unit time of said first rotor means, and thus for increasing the torque produced by said second rotor means.

22. A system as claimed in claim 17, further comprising a rotary shaft extending integrally through said first rotor means along said axis, said shaft being fixed to said first rotor means for rotation therewith, said shaft having an intermediate shoulder, said second rotor means being rotatably mounted on said shaft and resting on said shoulder such that said shoulder bears the force of a magnetic attraction between said first and second rotor means, and pressing means for, during fast feed or rewinding operation of said system, applying to said shoulder through said second rotor means a compressive force controllable to vary the torque available from said second rotor means.

* * * * *